A. G. H. THATCHER.
MEANS FOR CLOSING OR SEALING UP VESSELS.
APPLICATION FILED DEC. 27, 1917.

1,271,242.

Patented July 2, 1918.

Inventor.
Albert G. H. Thatcher
by Herbert W. Jenner
Attorney.

UNITED STATES PATENT OFFICE.

ALBERT GEORGE HENDY THATCHER, OF WEST BRIDGFORD, ENGLAND.

MEANS FOR CLOSING OR SEALING UP VESSELS.

1,271,242.

Specification of Letters Patent.

Patented July 2, 1918.

Application filed December 27, 1917. Serial No. 209,198.

*To all whom it may concern:*

Be it known that I, ALBERT GEORGE HENDY THATCHER, a subject of the King of Great Britain, and a resident of West Bridgford, in the county of Nottingham, England, have invented a certain new and useful Improvement in Means for Closing or Sealing Up Vessels, of which the following is a specification.

This invention relates to improvements in means for closing or sealing up vessels, such as jars and the like, containing say for example cooked or partially cooked fruit, and refers to a floating cover which fits loosely in the mouth of a jar or vessel and is secured in position by means of wax, fat, or other fusible substance, which is introduced in a melted state. The object of the present invention is to provide means of this description that can be successfully used in connection with ordinary jars or vessels, will require a small amount of fusible sealing substance to make a perfectly secure and air proof joint, and with a minimum of the wax or sealing substance in contact with the contents.

Figure 1:
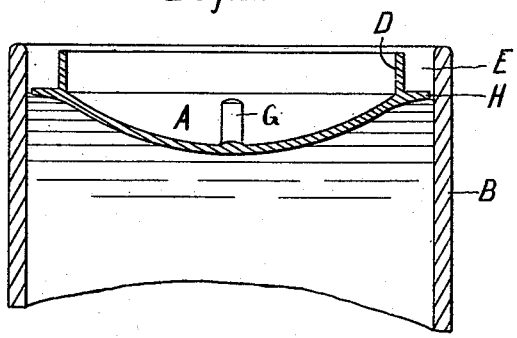

Referring to the accompanying drawings, Figure 1 is a sectional elevation, and

Figure 2:
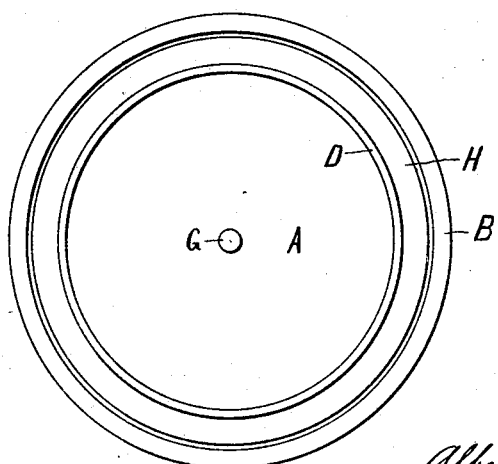

Fig. 2 a plan of a floating cover made according to my invention.

Like letters indicate like parts throughout the drawings.

According to this invention, the lower part of a cover A such as described is provided with an enlargement or external flange H, of such a diameter that it will fit loosely in the interior of the top of a jar or vessel B of the usual form as shown in the drawings, while its upper part D is of less diameter than the flange H, so as to provide above the latter, an annular space E (see Fig. 1) between the exterior of the said upper part D, and the interior of the jar or vessel B.

The cover A described is made of glass, earthenware, or the like, and in order to make it float, it is formed with the upper face recessed or concave, and the lower face convex. The form of the cover is preferably so adjusted that it will float on the top of the fluid or semi-fluid contents of the jar or vessel B, or on the water or fluid in which the fruit or other food has been cooked, with the edge of the flange H just immersed therein.

This floating cover A is placed in position and then secured and the vessel H hermetically sealed up, by subsequently filling the annular space E above the flange H with a fusible substance, such for example as mutton fat, paraffin wax, or the like. This substance which is of a lower specific gravity than the fluid in the jar or vessel B, is poured into the annular space E and is retained there while in its melted state, by the flange H and the fluid or semi-fluid contents which seal the narrow opening between the edge of the said flange H and the interior of the vessel B, so that the fusible substance can set or solidify undisturbed, and thus form a perfect joint or seal.

The convex lower face of the cover A prevents air from being trapped on its underside when it is placed in position, and the presence of air in the vessel can thus be entirely obviated.

For convenience in placing the cover A in position a central projection G is provided on the upper side to serve as a handle.

What I claim as my invention and desire to cover by Letters Patent is:—

The combination, with a storage vessel, of a cover comprising a pan having a single annular flange at its lower edge adapted to slide in the said vessel, and having a cylindrical portion extending upwardly from the inner periphery of the said flange and forming an annular space in the vessel above the said flange into which sealing material is poured, said pan having also a concavo-convex bottom portion of sufficient buoyancy to float the pan on the liquid contents of the vessel without submerging the said flange.

In witness whereof I have hereunto set my hand in presence of two witnesses.

ALBERT GEORGE HENDY THATCHER.

Witnesses:
 H. C. SHELDON,
 A. M. HARRIS.

Copies of this patent may be obtained for five cents each, by addressing the "Commissioner of Patents, Washington, D. C."